US012658003B2

(12) United States Patent　(10) Patent No.:　US 12,658,003 B2

Warms et al.　(45) Date of Patent:　Jun. 16, 2026

(54) LONG TERM PERSISTENCE FEATURE SYSTEMS AND METHODS IN A GAMING ENVIRONMENT

(71) Applicant: Aristocrat Technologies, Inc., Las Vegas, NV (US)

(72) Inventors: Nathan Warms, Austin, TX (US); Rogelio Decasa, Jr., Renton, WA (US); Erick Ching, Cedar Park, TX (US); Hanna Sanborn, Georgetown, TX (US); Jennifer Mizzi, Ewa Beach, HI (US)

(73) Assignee: Aristocrat Technologies, Inc., Las Vegas, NV (US)

( * ) Notice: Subject to any disclaimer, the term of this patent is extended or adjusted under 35 U.S.C. 154(b) by 306 days.

(21) Appl. No.: 18/358,697

(22) Filed: Jul. 25, 2023

(65) Prior Publication Data

US 2024/0105016 A1　Mar. 28, 2024

Related U.S. Application Data

(60) Provisional application No. 63/376,728, filed on Sep. 22, 2022.

(51) Int. Cl.
*G07F 17/32*　(2006.01)
*G06F 7/58*　(2006.01)

(52) U.S. Cl.
CPC .......... *G07F 17/3267* (2013.01); *G06F 7/588* (2013.01); *G07F 17/3227* (2013.01); *G07F 17/3237* (2013.01)

(58) Field of Classification Search
CPC ............. G07F 17/3267; G07F 17/3227; G07F 17/3237; G07F 17/3213; G07F 17/3244; G06F 7/588
See application file for complete search history.

(56) References Cited

U.S. PATENT DOCUMENTS

| | | |
|---|---|---|
| 2003/0157978 A1 | 8/2003 | Englman |
| 2005/0255903 A1 | 11/2005 | Jackson |
| 2006/0246979 A1* | 11/2006 | Chim .................. G07F 17/3244 463/13 |
| 2007/0077979 A1 | 4/2007 | Cohn |
| 2008/0293478 A1 | 11/2008 | Anderson |
| 2009/0239631 A1 | 9/2009 | Aoki |

(Continued)

*Primary Examiner* — Kevin Y Kim

(74) *Attorney, Agent, or Firm* — Armstrong Teasdale LLP

(57)　ABSTRACT

An electronic gaming system is provided. The electronic gaming system may include a game display configured to display a game interface including a first matrix having a first plurality of matrix positions and a second matrix having a second plurality of matrix positions, a memory, and a processor in communication with the game display and the memory. The processor may be configured to identify a user profile associated with a current session, retrieve, from the memory in association with the identified user profile, a record of a first persistent symbol displayed in a first matrix position of the second plurality of matrix positions, generate, in the first matrix, a base game outcome, determine, based on the base game outcome, to increment the value associated with the first persistent symbol in the first matrix position, and increment the value associated with the first persistent symbol in the memory.

18 Claims, 14 Drawing Sheets

(56) References Cited

U.S. PATENT DOCUMENTS

| | | | |
|---|---|---|---|
| 2009/0247271 A1 | 10/2009 | Olive | |
| 2010/0120514 A1 | 5/2010 | Caputo | |
| 2013/0157741 A1 | 6/2013 | Pacey | |
| 2013/0203478 A1 | 8/2013 | Kennedy | |
| 2014/0018146 A1 | 1/2014 | Zielinski | |
| 2014/0087832 A1* | 3/2014 | Zoltewicz | G07F 17/3213 |
| | | | 463/20 |
| 2014/0364193 A1 | 12/2014 | Williamson | |
| 2015/0194019 A1 | 7/2015 | Hornik | |
| 2016/0364956 A1 | 12/2016 | Saunders | |
| 2018/0130299 A1 | 5/2018 | Lamb | |
| 2018/0204414 A1* | 7/2018 | Narducci | G07F 17/3244 |
| 2019/0244480 A1 | 8/2019 | Marsh | |
| 2020/0074784 A1 | 3/2020 | Caputo | |
| 2020/0219357 A1 | 7/2020 | Kania | |
| 2021/0319650 A1 | 10/2021 | Nelson | |

* cited by examiner

300

PLAYER INPUT(S)

400

406

404

408

| 1(.25) | 1 | 6(.25) | 3(.25) | 4(.25) |
|--------|---|--------|--------|--------|
| 1 | 4X(1.25) | 5(.5) | 1 | 1(.25) |
| 3(.25) | 1 | 1 | 7(.25) | 1 |

416

402

408

| JACK | KING | FEATURE FEATURE | PIC4 | PIC3 |
|------|------|-----------------|------|------|
| PIC1 | FEATURE FEATURE | ACE | PIC1 | 10 |
| PIC5 | 10 | PIC1 | FEATURE FEATURE | PIC1 |

| 2(.25) | 2 | 7(.25) | 4(.25) | 5(.25) |
|--------|---|--------|--------|--------|
| 2 | AWARDED AWARDED | 6(.5) | 2 | 2(.25) |
| 4(.25) | 2 | 2 | 8(.25) | 2 |

416

402

408

| JACK | KING | FEATURE FEATURE | PIC4 | PIC3 |
|------|------|-----------------|------|------|
| PIC1 | FEATURE FEATURE | ACE | PIC1 | 10 |
| PIC5 | 10 | PIC1 | FEATURE FEATURE | PIC1 |

416                416

LONG TERM PERSISTENCE FEATURE SYSTEMS AND METHODS IN A GAMING ENVIRONMENT

CROSS-REFERENCE TO RELATED APPLICATIONS

This application claims the benefit of priority to U.S. Provisional Patent Application No. 63/376,728, filed Sep. 22, 2022, and entitled "LONG TERM PERSISTENCE FEATURE SYSTEMS AND METHODS IN A GAMING ENVIRONMENT," the contents and disclosures of which are hereby incorporated by reference in their entirety.

TECHNICAL FIELD

The field of disclosure relates generally to electronic gaming, and more particularly, to a long term persistence feature that enables a user to maintain progress through multiple gaming sessions.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

BRIEF DESCRIPTION

In one aspect, a gaming system is provided. The gaming system may include a game display configured to display a game interface including a first matrix having a first plurality of matrix positions and a second matrix having a second plurality of matrix positions, a memory, and a processor in communication with the game display and the memory. The processor may be configured to identify a user profile associated with a current session, perform a respective RNG call for each of the first plurality of matrix positions, determine to generate, in at least a first matrix position of the first plurality of matrix positions, a first persistent symbol based on the respective RNG call, the first persistent symbol having an associated value and an associated credit amount, record, in the memory in association with the identified user profile, the first persistent symbol generated in the first matrix position and the value associated with the first persistent symbol, generate, in the second matrix, a base game outcome, determine, based on the base game outcome, to increment the value associated with the first persistent symbol, and increment the value associated with the first persistent symbol in the first matrix position in the memory.

In another aspect, a method is provided. The method may be performed by a gaming system including a game display configured to display a game interface including a first matrix having a first plurality of matrix positions and a second matrix having a second plurality of matrix positions, a memory, and a processor in communication with the game display and the memory. The method may include identifying a user profile associated with a current session, performing a respective RNG call for each of the first plurality of matrix positions, determining to generate, in at least a first matrix position of the first plurality of matrix positions, a first persistent symbol based on the respective RNG call, the first persistent symbol having an associated value and an associated credit amount, recording, in the memory in association with the identified user profile, the first persistent symbol generated in the first matrix position and the value associated with the first persistent symbol, generating, in the second matrix, a base game outcome, determining, based on the base game outcome, to increment the value associated with the first persistent symbol, and incrementing the value associated with the first persistent symbol in the first matrix position in the memory.

In another aspect, at least one non-transitory computer-readable media having computer-executable instructions embodied thereon is provided. When executed by a processor in communication with a memory and a game display configured to display a game interface including a first matrix having a first plurality of matrix positions and a second matrix having a second plurality of matrix positions, the computer-executable instructions may cause the processor to identify a user profile associated with a current session, perform a respective RNG call for each of the first plurality of matrix positions, determine to generate, in at least a first matrix position of the first plurality of matrix positions, a first persistent symbol based on the respective RNG call, the first persistent symbol having an associated value and an associated credit amount, record, in the memory in association with the identified user profile, the first persistent symbol generated in the first matrix position and the value associated with the first persistent symbol, generate, in the second matrix, a base game outcome, determine, based on the base game outcome, to increment the value associated with the first persistent symbol, and increment the value associated with the first persistent symbol in the first matrix position in the memory.

In another aspect, an electronic gaming system is provided. The electronic gaming system may include at least one game display configured to display a game interface including a first matrix having a first plurality of matrix positions for displaying a base game, and a second matrix having a second plurality of matrix positions for displaying persistent symbols, at least one memory, and at least one processor in communication with the at least one game display and the at least one memory. The at least one processor may be configured to identify a user profile associated with a current session, retrieve, from the at least one memory in association with the identified user profile, a record of a first persistent symbol displayed in a first matrix position of the second plurality of matrix positions of the second matrix, a value associated with the first persistent symbol, and a credit amount associated with the first persistent symbol, generate, in the first matrix, a base game outcome, determine, based on the base game outcome, to increment the value associated with the first persistent symbol in the first matrix position, and increment the value associated with the first persistent symbol in the first matrix position in the at least one memory.

In another aspect, a method is provided. The method may be performed by a gaming system including a game display configured to display a game interface including a first matrix having a first plurality of matrix positions for displaying a base game and a second matrix having a second plurality of matrix positions for displaying persistent symbols, a memory, and a processor in communication with the game display and the memory. The method may include identifying a user profile associated with a current session, retrieving, from the memory in association with the identified user profile, a record of a first persistent symbol displayed in a first matrix position of the second plurality of matrix positions, a value associated with the first persistent symbol, and a credit amount associated with the first persistent symbol, generating, in the first matrix, a base game outcome, determining, based on the base game outcome, to increment the value associated with the first persistent symbol in the first matrix position, and incrementing the value associated with the first persistent symbol in the first matrix position in the memory.

In another aspect, at least one non-transitory computer-readable media having computer-executable instructions embodied thereon is provided. When executed by a processor in communication with a memory and a game display configured to display a game interface including a first matrix having a first plurality of matrix positions for displaying a base game and a second matrix having a second plurality of matrix positions for displaying persistent symbols, the computer-executable instructions may cause the processor to identify a user profile associated with a current session, retrieve, from the memory in association with the identified user profile, a record of a first persistent symbol displayed in a first matrix position of the second plurality of matrix positions, a value associated with the first persistent symbol, and a credit amount associated with the first persistent symbol, generate, in the first matrix, a base game outcome, determine, based on the base game outcome, to increment the value associated with the first persistent symbol in the first matrix position, and increment the value associated with the first persistent symbol in the first matrix position in the memory.

BRIEF DESCRIPTION OF THE DRAWINGS

FIG. 4G illustrates another exemplary image of the game display shown in FIGS. 4A-4F.

DETAILED DESCRIPTION

Figure 1:
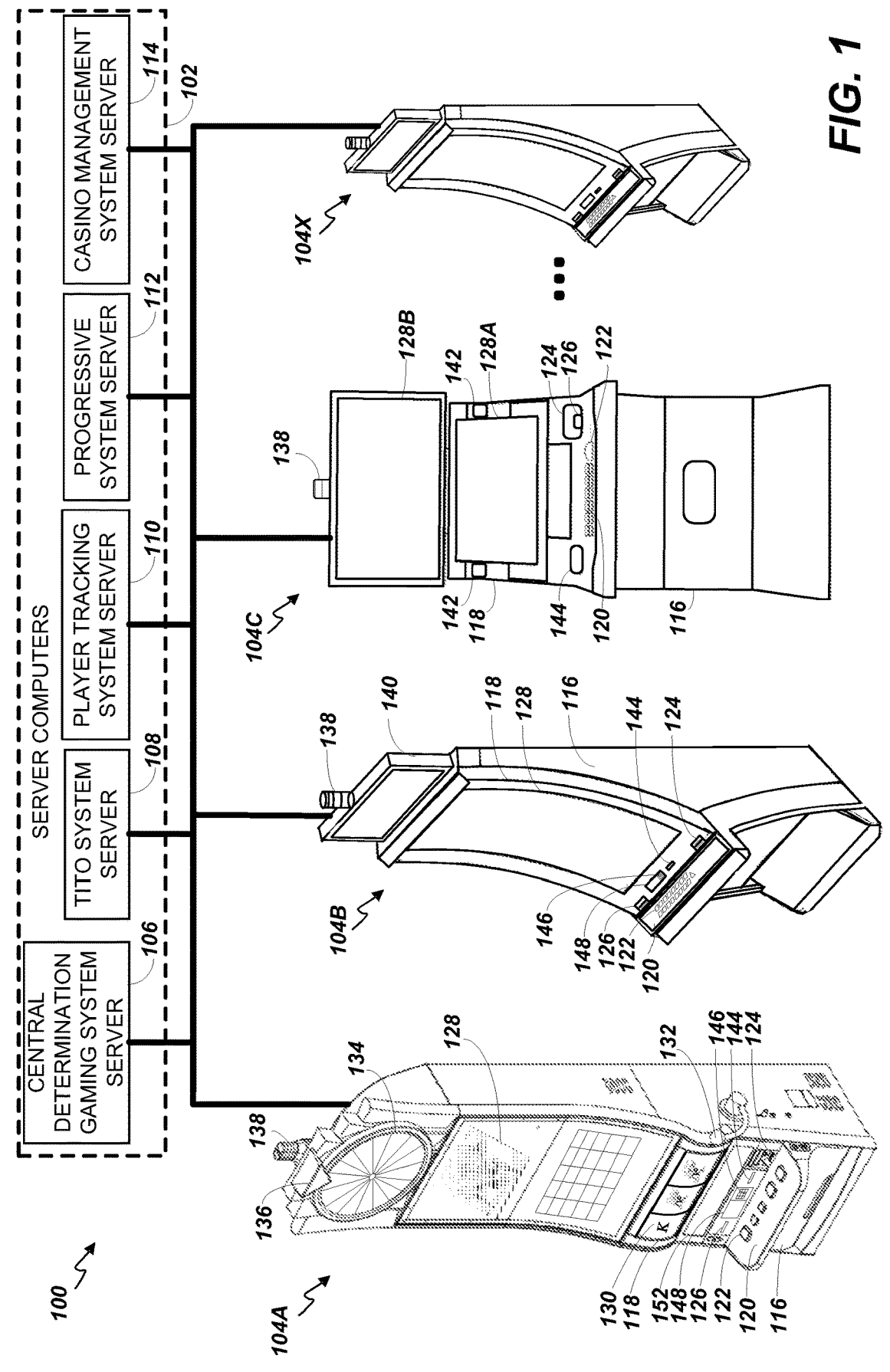
FIG. 1 is an exemplary diagram showing several gaming machines networked with various gaming related servers.

The systems and methods described herein include a gaming device that operates and/or is configured to implement a long term persistence feature in a gaming session. In the example embodiment, upon initiation of a game session at a device (e.g., and EGM, mobile device, or other device), a user profile may be identified (e.g., based on login information and/or a device identifier associated with the device). The device may be configured to communicate with a game display for causing a base matrix to be displayed thereon, which may be used to display a base game (e.g., a slot-type game) and at least one secondary matrix, which may be used to display the long term persistence feature. The long term persistence feature may be recorded in a memory and associated with the user profile, so that the user may resume progress of the long term persistence feature upon subsequent game sessions.

In the example embodiment, the long term persistence feature may include displaying symbols (referred to herein as "persistent symbols") within matrix positions of the secondary matrix. The persistent symbols may each have an associated value (e.g., a number from one to ten) and an associated credit amount or other potential award. As described in further detail below, the value may be incremented in response to certain patterns being displayed in the base matrix in response to an instance of the base game, and the credit amount or other prize may be credited to the user if the value reaches a threshold amount (e.g., ten). When generated and/or updated within the secondary matrix, the location, values, and/or credit amounts associated with the persistent symbols may be recorded and/or updated in the memory. In some alternative embodiments, the credit amount or other prize may be determined at some point after the persistent symbol is first generated (e.g., when the value reaches the threshold amount and/or when the credit amount or prize is first displayed to the user). Upon subsequent startups of the game, the user profile associated with the user is identified as described above, and the secondary matrix may be displayed according to the record so that the user may resume previous progress.

When the long term persistence feature is initiated for a first time for a particular user and user profile (i.e., there is no previous game session and/or records associated with the user profile), an RNG call may be performed for each matrix position of the secondary matrix and compared to a lookup table to determine whether to initially display a persistent symbol in that position and, in some embodiments, an initial value and/or credit amount to be associated with the persistent symbol. In some embodiments, separate lookup tables may be used (e.g., for each column, row, or matrix position), such that certain matrix positions may have a higher probability of displaying a persistent symbol than others. In some embodiments, the lookup tables may be constructed such that certain matrix positions have a relatively high chance of displaying a high-value persistent symbol upon initialization of the game, for example, in order to engage the user.

When an instance of the base game is performed, a symbol is displayed in each matrix position of the base matrix. The type of symbol displayed in each matrix position of the base matrix is determined by comparing one or more RNG calls to one or more respective lookup tables. As with the secondary matrix, when a base game instance is performed, different lookup tables may be used (e.g., for each column and/or each row), which may result in different probabilities of certain symbols being displayed in particular matrix positions of the base matrix. When the symbols are generated in the base matrix, an accompanying animation (e.g., spinning reels) may be displayed. The base game outcome including the pattern of symbols displayed in the base matrix may be analyzed with respect to a pay table to determine if an award, if any, should be credited to the user.

If certain symbols, referred to herein as "scatter symbols" are displayed in response to the base game instance, additional persistent symbols may be generated in the secondary matrix. For example, the base matrix and secondary matrix may be the same size (e.g., have the same number of rows and columns), such that each position of the base matrix has a corresponding position in the secondary matrix. If a threshold number of scatter symbols (e.g., three) are displayed, persistent symbols may be generated in the positions of the secondary matrix corresponding to the positions of the base matrix wherein the scatter symbols are displayed. If a persistent symbol is already displayed in one of these positions, another effect, such as a multiplier to the associated credit value, may be applied to the persistent symbol. In some embodiments, if a threshold number of certain symbols referred to herein as "feature symbols" are displayed in response to a base game instance, persistent symbols may be generated in and/or multipliers applied to each matrix position of the secondary matrix. A probability of feature symbols being displayed in the base matrix may be less than that of scatter symbols being displayed.

The values associated with the persistent symbols may be incremented in response to certain outcomes in the base game. For example, certain symbols, referred to herein as "wild symbols," may be displayed in the base matrix. When wild symbols are displayed in the base matrix, the values of persistent symbols in corresponding columns of the secondary matrix may be incremented. In some embodiments, additional conditions are necessary for incrementing the values. For example, the wild symbols may need to be displayed as part of a winning combination (e.g., a line win) as defined by the pay table associated with the base game. Alternatively, in some embodiments, a display of symbols other than wild symbols may cause the values to increment. When the value associated with the persistent symbol reaches a predetermined threshold value (e.g., ten), the credit value associated with the persistent symbol is credited to the user, and the persistent symbol is removed from the secondary matrix.

Because different lookup tables (e.g., for each column and/or row) may be used to evaluate respective matrix positions, certain matrix positions may be assigned a higher or lower probability of displaying certain symbols (e.g., scatter symbols, wild symbols and/or feature symbols). This in turn may enable the probability of persistent symbols being generated and/or grown (e.g., by incrementing the associated value) to vary for each matrix position.

In some embodiments, more than one secondary matrix may be associated with the user profile. For example, the base game may include certain predefined bet levels for a game instance, and a different secondary matrix may be associated with each bet level. In some such embodiments, one secondary matrix is displayed at a time (e.g., the secondary matrix corresponding to the most recent bet level). Alternatively, multiple secondary matrices may be displayed simultaneously.

Additionally, certain technical benefits are realized based upon the present disclosure. For example, a plurality of random determinations may be made (e.g., via a plurality of RNG outcomes and/or a plurality of lookup tables) in order to determine not only one or more game outcomes but also one or more display features. For example, the display of persistent symbols, scatter symbols, wild symbols, feature symbols, or the determination of initial values and/or credit amounts associated with persistent symbols may be randomly determined (e.g., using an RNG call and an associated lookup table). The amount of random determinations possible in embodiments described herein result in an increased variety of possible game outcomes to be provided and therefore an improved game as it is less likely any outcomes would be repeated (e.g., displayed in the same manner).

Further, different lookup tables may be selected (e.g., depending on the row, column, and/or matrix position) for each random determination, which further increases the variability of possible game and/or display outcomes. The selection of different lookup tables may also be used to control a volatility and/or RTP of the game. For example, matrix positions having a higher probability of generating a persistent symbol may be associated with a lower probability of growing or incrementing the value associated with the generated persistent symbol, and matrix positions having a lower probability of generating a persistent symbol may be associated with a higher probability of growing or incrementing the value associated with the generated persistent symbol. Utilizing different lookup tables may further enable computational resources to be used more efficiently, because the system may perform lookups rather than performing additional computations to increase variability and/or to control the volatility and/or RTP of the game.

Certain display benefits are also realized herein as technical benefits achieved by the present disclosure (e.g., because certain technical problems arise when trying to communicate/display a significant amount of information on a screen of limited size). For example, as explained herein, in some embodiments, animations may be displayed during the base game (e.g., a reel spin), when persistent symbols are generated (e.g., a seed or plant being planted), when values associated with the persistent symbols are incremented (e.g., the plant being watered and/or growing), when the credit amount is awarded due to the threshold value being reached (e.g., the plant being picked or harvested, etc.). Accordingly, the present disclosure provides a variety of improvements in communicating information to a player in a limited amount of display space/real estate—thereby providing an improved interface.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
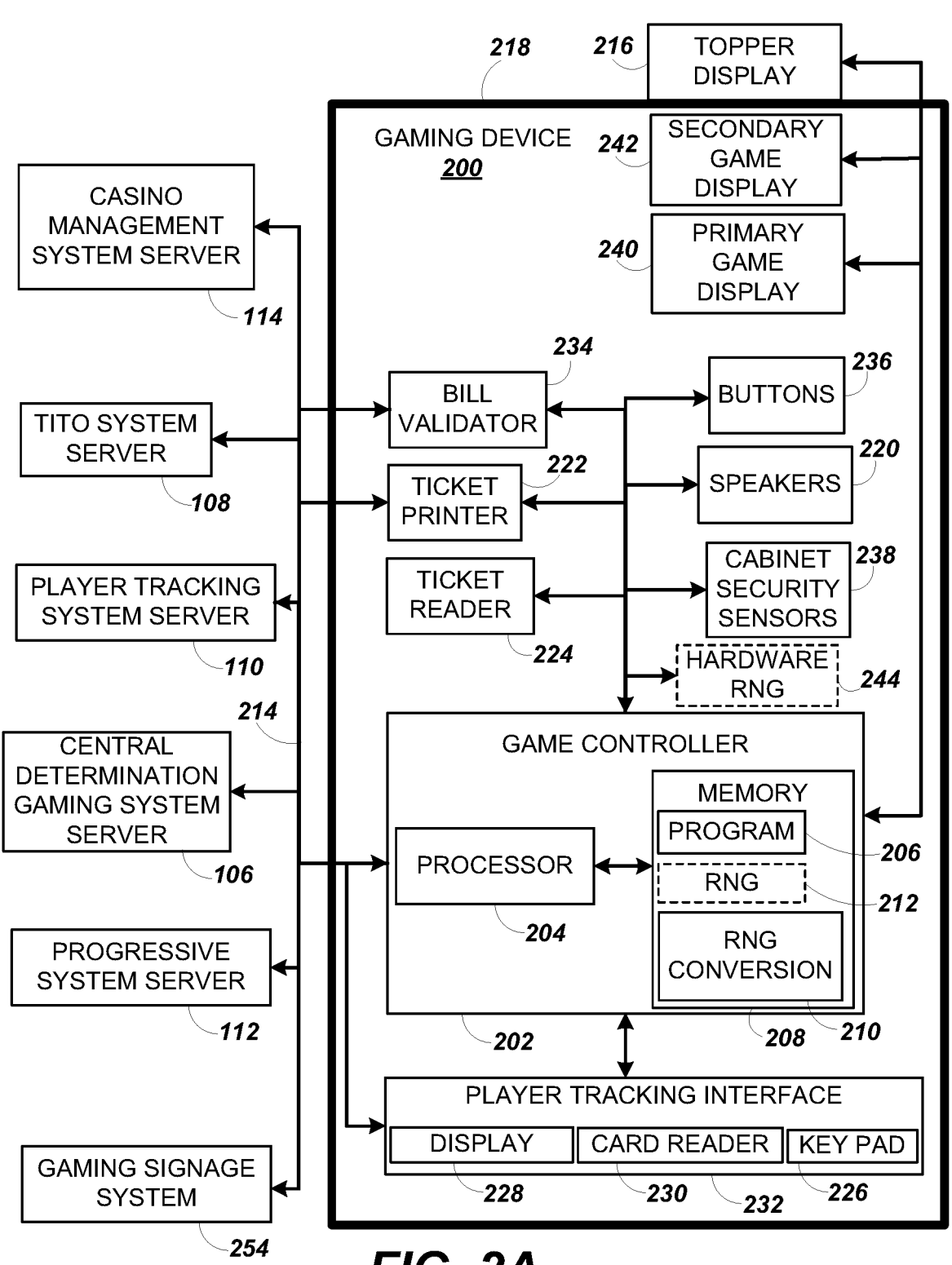
FIG. 2A is a block diagram showing various functional elements of an exemplary gaming machine.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
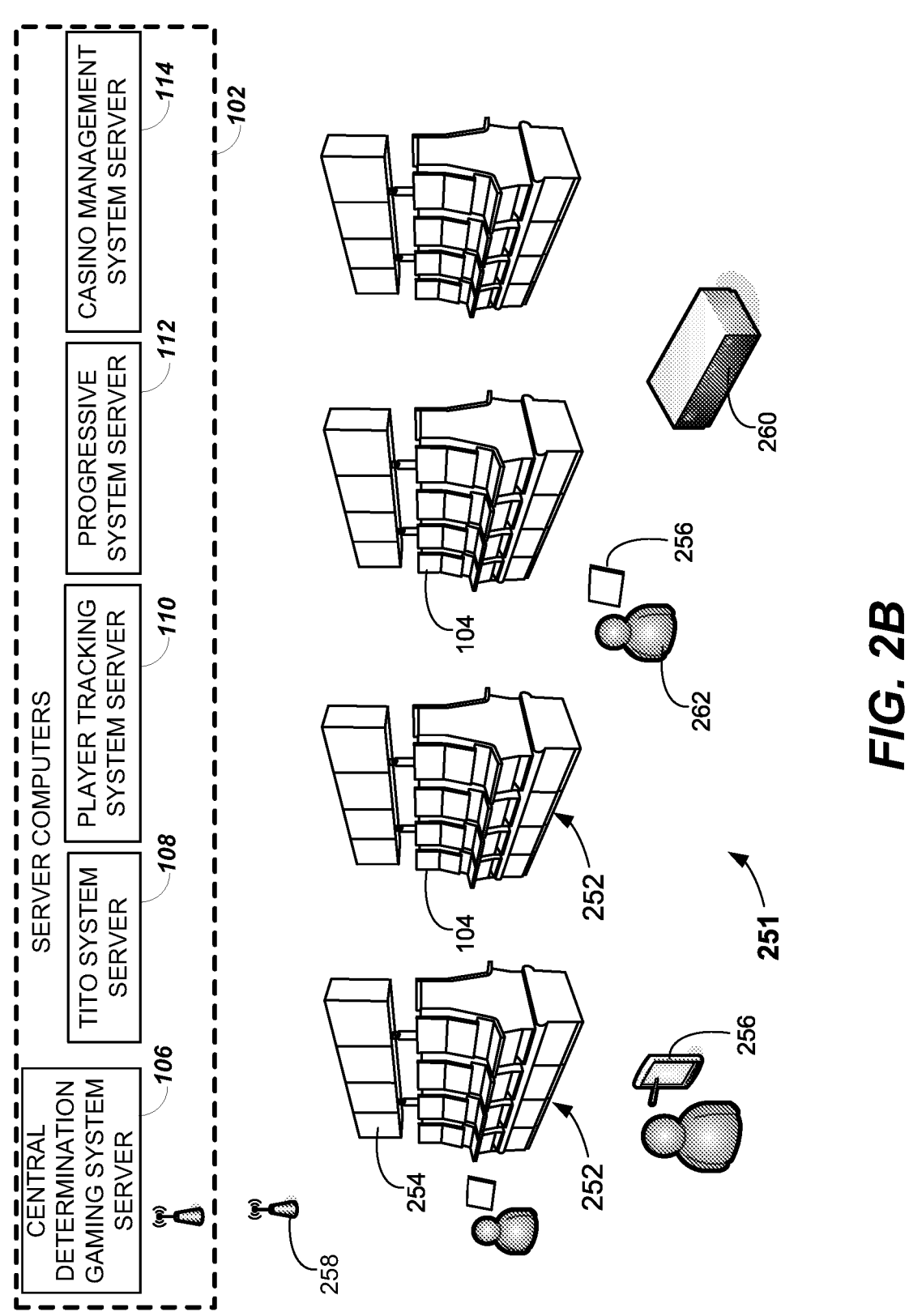
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor(s) to verify the identity of an authorized patron. Some mobile gaming devices 256 may be configured to function only within a predetermined or configurable area, such as a casino gaming area.

Figure 2C:
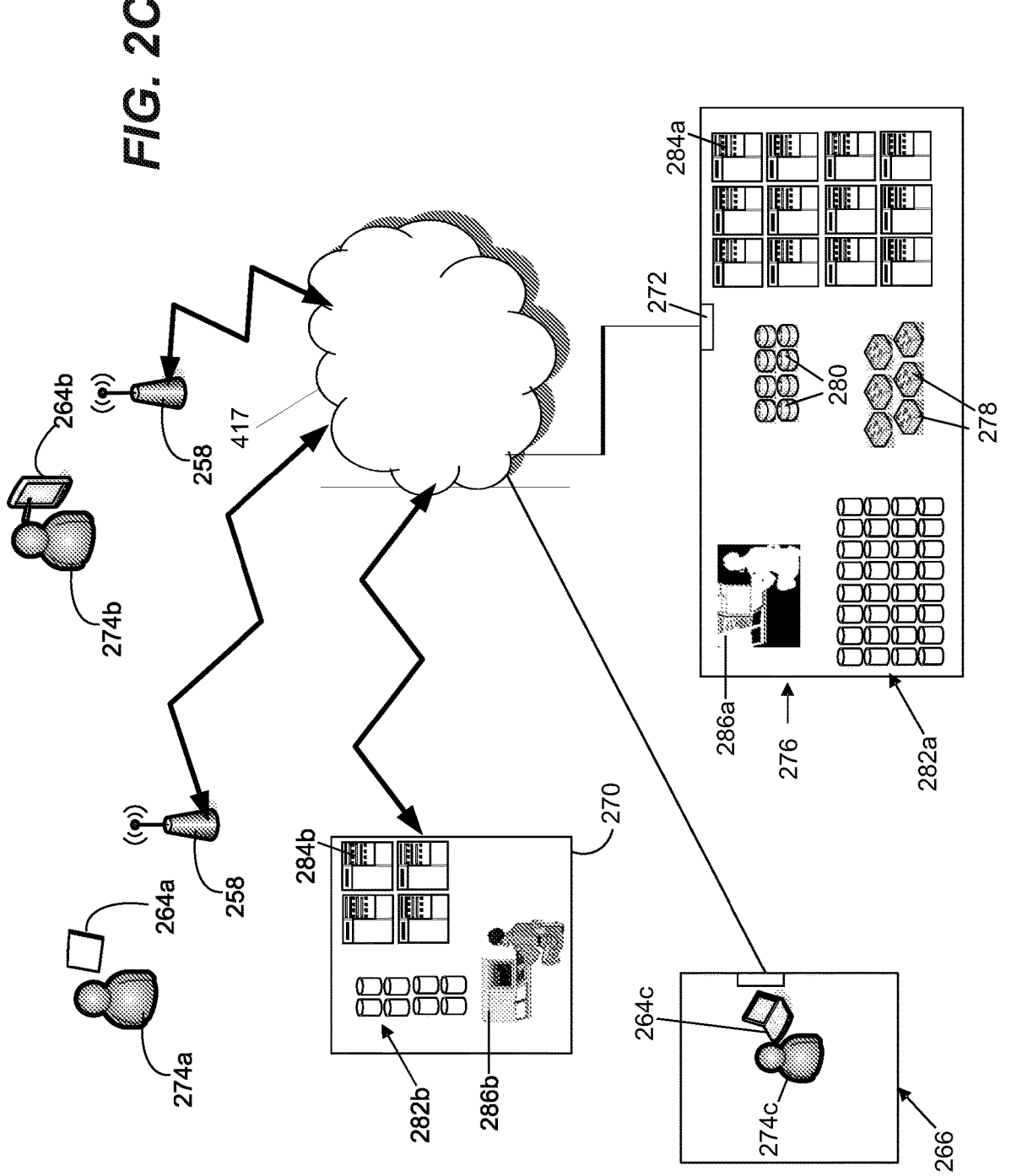
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264a, 264b and 264c are capable of communication via one or more networks 417. The networks 417 may, for example, include one or more cellular telephone networks, the Internet, etc. In this example, the EUDs 264a and 264b are mobile devices: according to this example the EUD 264a is a tablet device and the EUD 264b is a smart phone. In this implementation, the EUD 264c is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282a, servers 284a and one or more workstations 286b. The servers 284a may, for example, be configured to provide access to a library of games for online game play. In some examples, code for executing at least some of the games may initially be stored on one or more of the storage devices 282a. The code may be subsequently loaded onto a server 284a after selection by a player via an EUD and communication of that selection from the EUD via the networks 417. The server 284a onto which code for the selected game has been loaded may provide the game according to selections made by a player and indicated via the player's EUD.

In other examples, code for executing at least some of the games may initially be stored on one or more of the servers 284a. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284b, storage devices 282b, and one or more workstations 286b. According to this example, the financial institution data center 270 is configured to maintain financial accounts, such as checking accounts, savings accounts, loan accounts, etc. In some implementations one or more of the authorized users 274a-274c may maintain at least one financial account with the financial institution that is serviced via the financial institution data center 270.

According to some implementations, the gaming data center 276 may be configured to provide online wagering games in which money may be won or lost. According to some such implementations, one or more of the servers 284a may be configured to monitor player credit balances, which may be expressed in game credits, in currency units, or in any other appropriate manner. In some implementations, the server(s) 284a may be configured to obtain financial credits from and/or provide financial credits to one or more financial institutions, according to a player's "cash in" selections, wagering game results and a player's "cash out" instructions. According to some such implementations, the server (s) 284a may be configured to electronically credit or debit the account of a player that is maintained by a financial institution, e.g., an account that is maintained via the financial institution data center 270. The server(s) 284a may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274a-274c), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
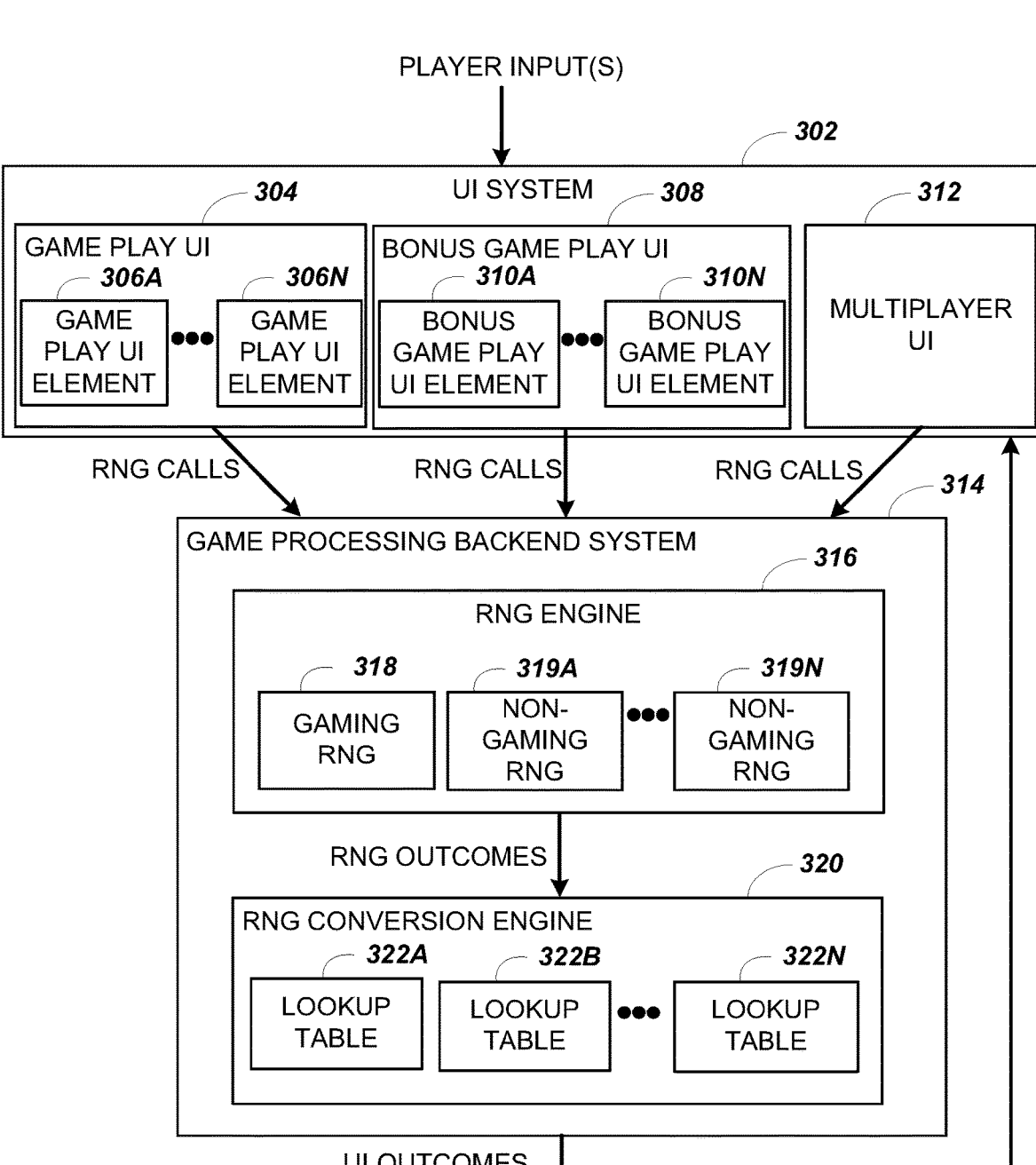
FIG. 3 illustrates, in block diagram form, an implementation of a game processing architecture algorithm that implements a game processing pipeline for the play of a game in accordance with various implementations described herein.
Figure 4A:
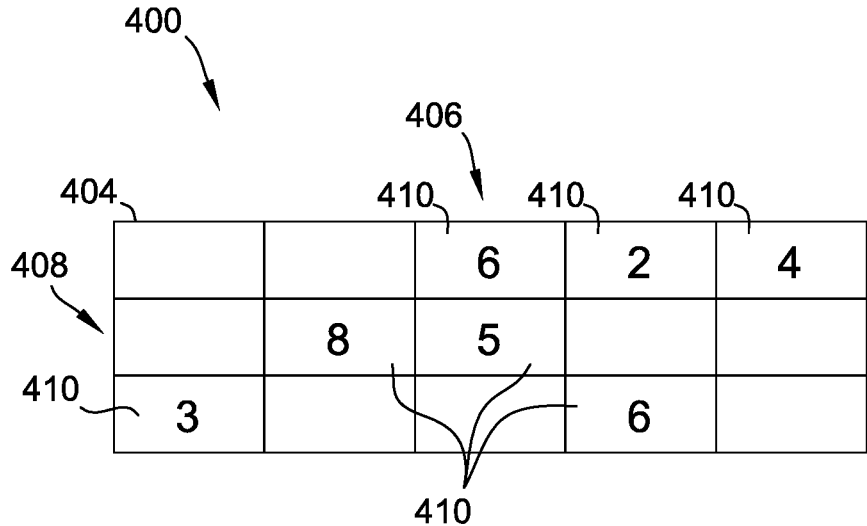
FIG. 4A illustrates an exemplary image of a game display according to an embodiment of the present disclosure.
Figure 4B:
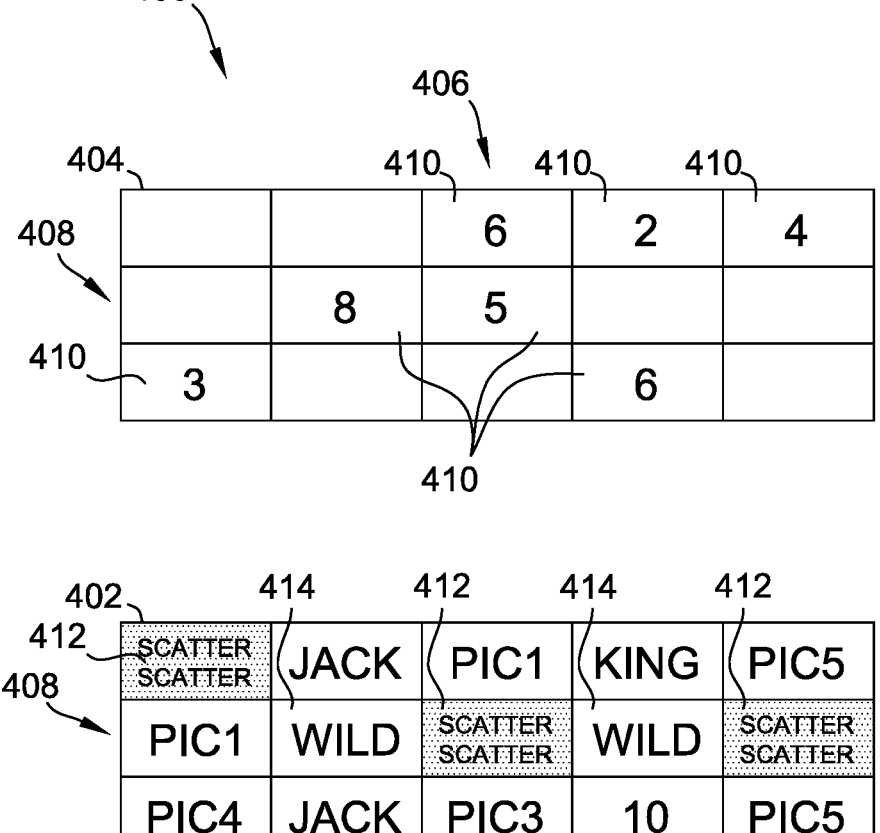
FIG. 4B illustrates another exemplary image of the game display shown in FIG. 4A.
Figure 4C:
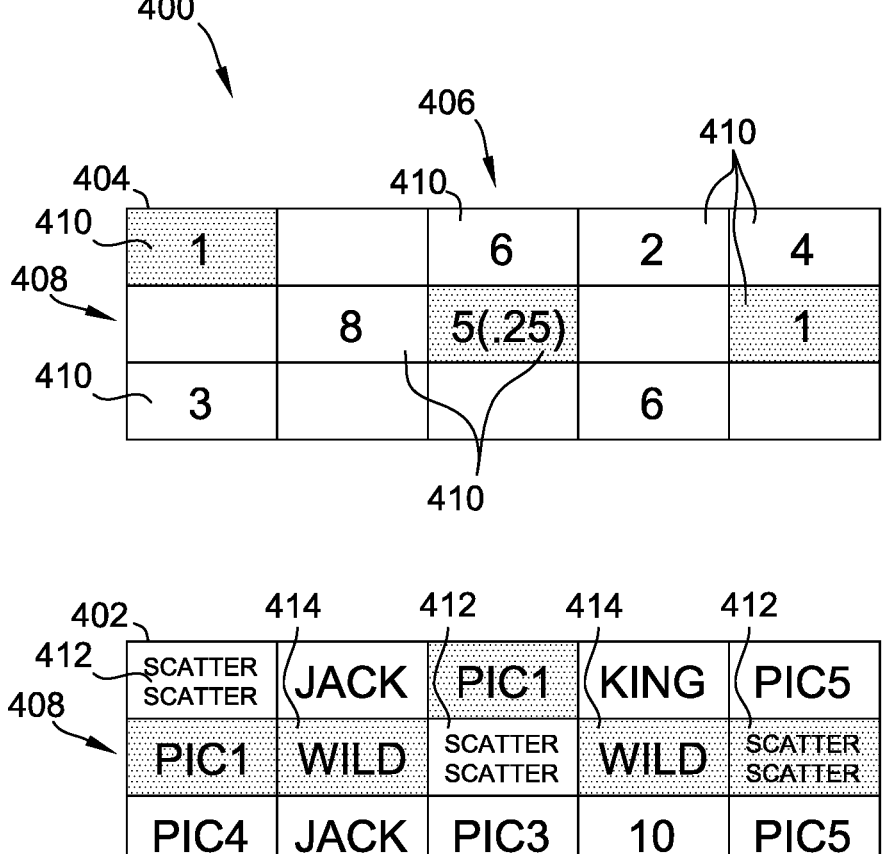
FIG. 4C illustrates another exemplary image of the game display shown in FIGS. 4A and 4B.
Figure 4D:
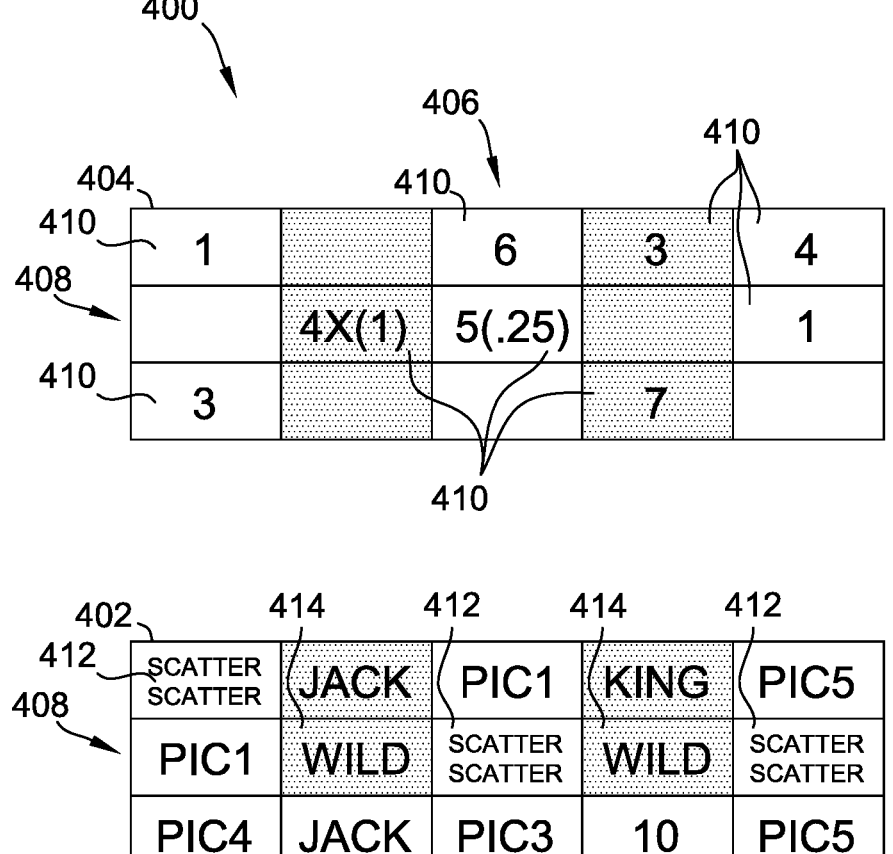
FIG. 4D illustrates another exemplary image of the game display shown in FIGS. 4A-4C.
Figure 4E:
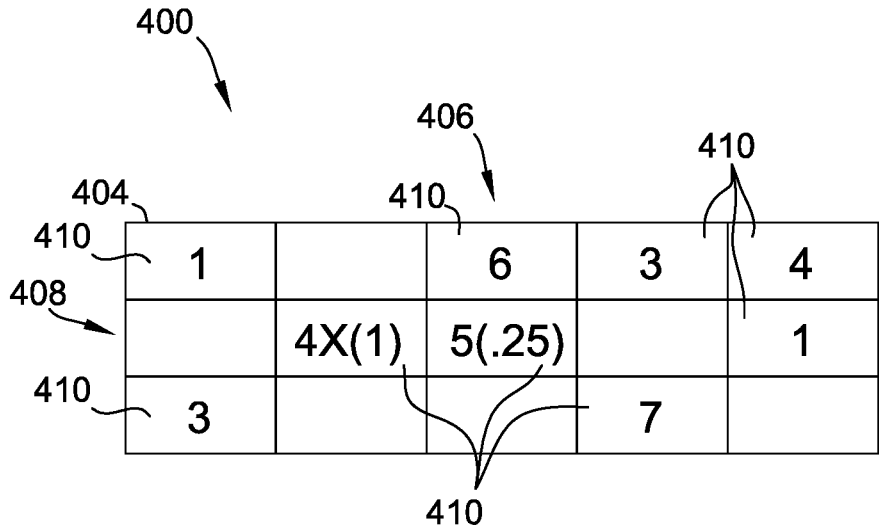
FIG. 4E illustrates another exemplary image of the game display shown in FIGS. 4A-4D.
Figure 4F:
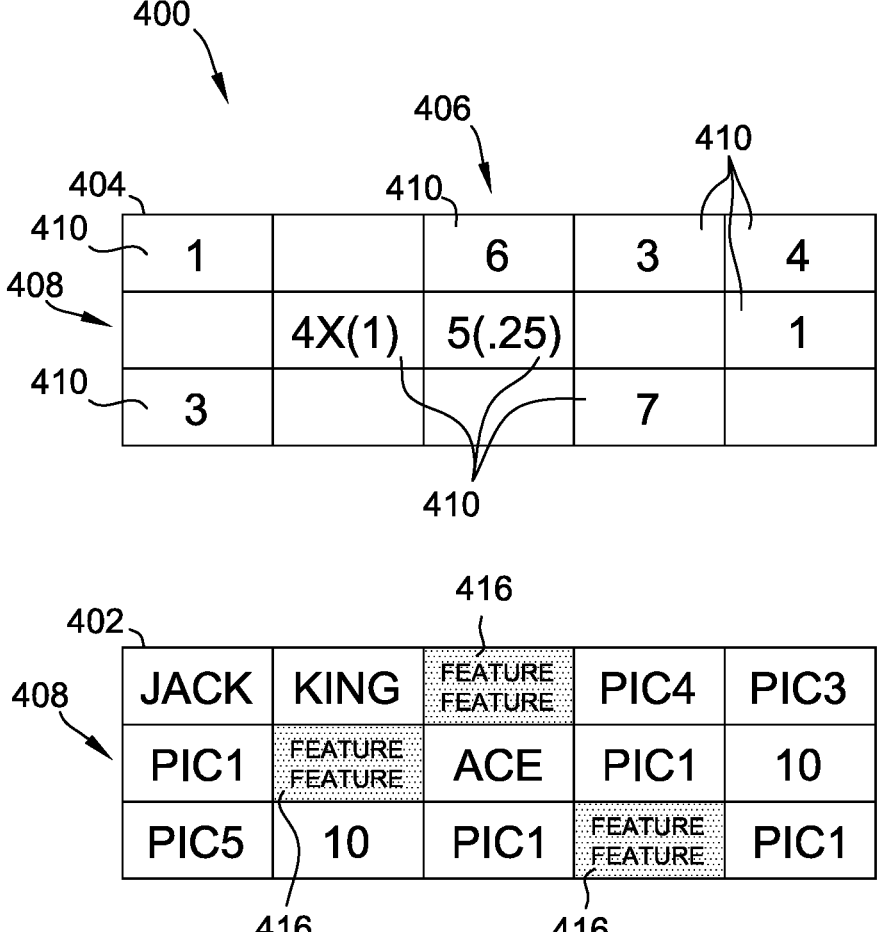
FIG. 4F illustrates another exemplary image of the game display shown in FIGS. 4A-4E.
Figure 4H:
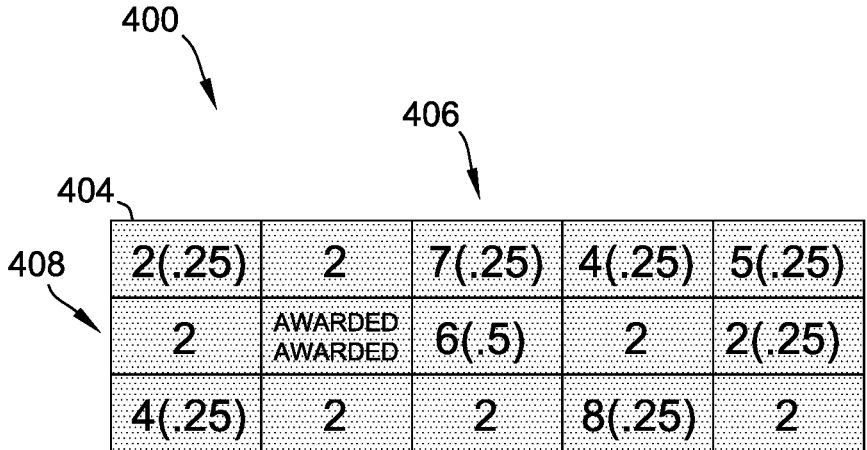
FIG. 4H illustrates another exemplary image of the game display shown in FIGS. 4A-4G.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system

302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

FIGS. 4A-4H depict an example game display 400, which may be displayed by, for example, gaming devices 104A-104X and/or mobile gaming devices 256. Game display 400 may include a base matrix 402 and a secondary matrix 404, each including a number of columns 406 (e.g., five) and a number of rows 408 (e.g., three). Both base matrix 402 and secondary matrix 404 may include the same number of columns 406 and rows 408, so that each matrix position of base matrix 402 has one corresponding matrix position in secondary matrix 404.

Upon initiation of the long term persistence feature, one or more persistent symbols 410 may be generated in respective matrix positions of secondary matrix 404. Each persistent symbol 410 has an associated value (e.g., from one to ten), which may be portrayed by the persistent symbol 410 literally (e.g., by including the value in the symbol) and/or symbolically. For example, each persistent symbol 410 may include a seed and/or plant, and a stage of growth of the seed and/or plant may correspond to the value associated with the corresponding persistent symbol 410 (e.g., with larger or older plants corresponding to larger values). Alternatively, other symbols that can convey growth and/or progression (e.g., persons or animals growing, buildings being constructed, food being cooked, objects being magically transformed into higher value objects) may be used. Each persistent symbol 410 also has an associated prize, which may be credited to the user when the persistent symbol reaches a predetermined value (e.g., ten), as described in further detail below. The prize associated with each persistent symbol 410 may be "hidden," in that the prize amount may not be displayed, e.g., on or in an area associated with the persistent symbol 410, until it is credited to the player and/or the associated persistent symbol 410 has reached a threshold value (e.g., nine out of ten).

To determine whether to generate a persistent symbol 410 in a particular matrix position, an RNG call may be performed and a lookup performed within a lookup table based on the RNG call (e.g., certain RNG outcomes may be associated with a persistent symbol 410 appearing). In some embodiments, each column 406, row 408, and/or matrix position of secondary matrix 404 may be associated with a different lookup table, enabling the probability of displaying a persistent symbol 410 to be set independently for each column 406, row 408, and/or matrix position, for example, to achieve a desired RTP or variation in game presentation outcomes. If a persistent symbol 410 is generated in a particular matrix position, the value associated with the persistent symbol 410 and/or the prize associated with the persistent symbol 410 may be determined based on the same RNG call and lookup table, or one or more of a separate RNG call and/or separate lookup table may be used to determine the initial value of the persistent symbol 410. For example, certain RNG call outcomes may be associated with different initial values and/or prizes for the persistent symbol 410. Persistent symbols 410 remain in place through multiple instances of the base game, as described in further detail below.

In response to a game instance, one of several possible base game symbols may be displayed in each matrix position of base matrix 402. To determine which base game symbol to display in each matrix position, RNG call may be performed and a lookup performed within a lookup table based on the RNG call (e.g., certain RNG outcomes may be associated with certain symbols). Similar to the determination to display persistent symbol 410 in secondary matrix 404, in some embodiments, each column 406, row 408, and/or matrix position of secondary matrix 404 may be associated with a different lookup table, enabling the probability of displaying certain symbols to be to be set independently for each column 406, row 408, and/or matrix position (e.g., to achieve a desired RTP or variation in game presentation outcomes).

Certain base game symbols, referred to herein as "scatter symbols" 412 (shown in FIGS. 4B-4D) may be displayed in base matrix 402 in response to the game instance. The display of scatter symbols 412 may affect secondary matrix 404. For example, if a threshold number (e.g., at least three) scatter symbols 412 are displayed in base matrix 402, the matrix positions of secondary matrix 404 that correspond to the matrix positions of base matrix 402 (e.g., matrix positions having the same column 406 and row 408) in which the scatter symbols 412 are displayed may be identified. If, in one of the identified matrix positions, no persistent symbol 410 is currently displayed, a new persistent symbol 410 may be generated in the identified matrix position. The generated persistent symbol 410 may be assigned a predefined initial value (e.g., the lowest possible value, or "one"), or alternatively, a randomly selected initial value and/or an initial value that depends on some state of the base game (e.g., a number of scatter symbols displayed, etc.). A prize may also be determined for the generated persistent symbol 410 based on, for example, an RNG call. If, for one of the identified matrix positions, a persistent symbol is currently displayed, the persistent symbol 410 may be modified, for example, by applying a multiplier to the persistent symbol 410, which may increase the award associated with the persistent symbol 410 as described in further detail below. The multiplier may be a predefined value (e.g., 1.25), or alternatively may be randomly selected and/or depend on some state of the base game (e.g., a number of scatter symbols displayed, etc.).

Certain base game outcomes may affect the persistent symbols 410 displayed in secondary matrix 404. For example, some of the base game symbols referred to herein as "wild symbols" 414 (shown in FIGS. 4B-4D), which may be used to complete certain combinations of symbols in the base game for a "winning" outcome (e.g., as defined by a pay table). When such a winning outcome occurs, the matrix positions of secondary matrix 404 that correspond to the matrix positions of base matrix 402 (e.g., matrix positions having the same column 406 and row 408) in which the wild symbols 414, or other specific symbols, are displayed may be identified. If a persistent symbol 410 is currently displayed in the identified matrix position, the value associated with the persistent symbol 410 may be incremented (e.g., from one to two, from two to three, and so on). When a persistent symbol 410 reaches a certain predefined value (e.g., ten), the prize associated with the persistent symbol 410 may be credited to the user. In embodiments wherein the prize associated with the persistent symbol 410 is not determined at the time the persistent symbol 410 is generated, the prize amount may be determined when the persistent symbol 410 reaches the predefined threshold value for crediting the prize.

In some embodiments, symbols referred to herein as "feature symbols" 416 (shown in FIGS. 4F-4H) may be displayed in base matrix 402 in response to game instances. An additional game feature may be triggered in response to a threshold number (e.g., three) feature symbols 416 being displayed, in which the effects described above with respect to both scatter symbols 412 and wild symbols 414 occur in each matrix position of secondary matrix 404. In other words, a persistent symbol 410 is generated in each empty matrix position of secondary matrix 404, a multiplier is applied to each existing persistent symbol 410, and the value associated with each existing persistent symbol 410 may be incremented.

The persistent symbols 410 displayed in secondary matrix may persist continually though multiple gameplay sessions, such that whenever the user resumes play, the persistent symbols 410 and their associated values and prizes may carry over from the previous gaming session. Gaming system server 106 may record the state of secondary matrix 404 for each user. For example, in embodiments wherein game display 400 is presented via mobile gaming device 256 (e.g., via an app), the user may be required to login to a profile account that is associated with the game record associated with the user. Additionally, or alternatively, a device ID, IP address, or other identifier associated with mobile gaming device 256 may be used to identify the player record. In embodiments wherein game display is presented by a dedicated gaming device such gaming devices 104A-104X, the player record may be associated with a loyalty account and/or other login information, and/or may be determined by detecting a device associated with the user (e.g., a mobile phone) that is proximate to gaming devices 104A-104X using a wireless connection (e.g., WiFi, Bluetooth, NFC, etc.). This ability to "save" the user's progress between gaming sessions may encourage the user to resume playing the game.

In some embodiments, game display 400 may include multiple secondary matrices 404, each associated with, for example, a different betting level of the base game. Thus, a single user profile may be associated with multiple secondary matrices 404, each of which may be updated when a game instance with a corresponding bet level is made in the base game. In some embodiments, one secondary matrix 404 is displayed at a given time (e.g., the matrix 404 corresponding to a most recent bet level). Alternatively, multiple secondary matrices 404 may be displayed concurrently.

Figure 5:
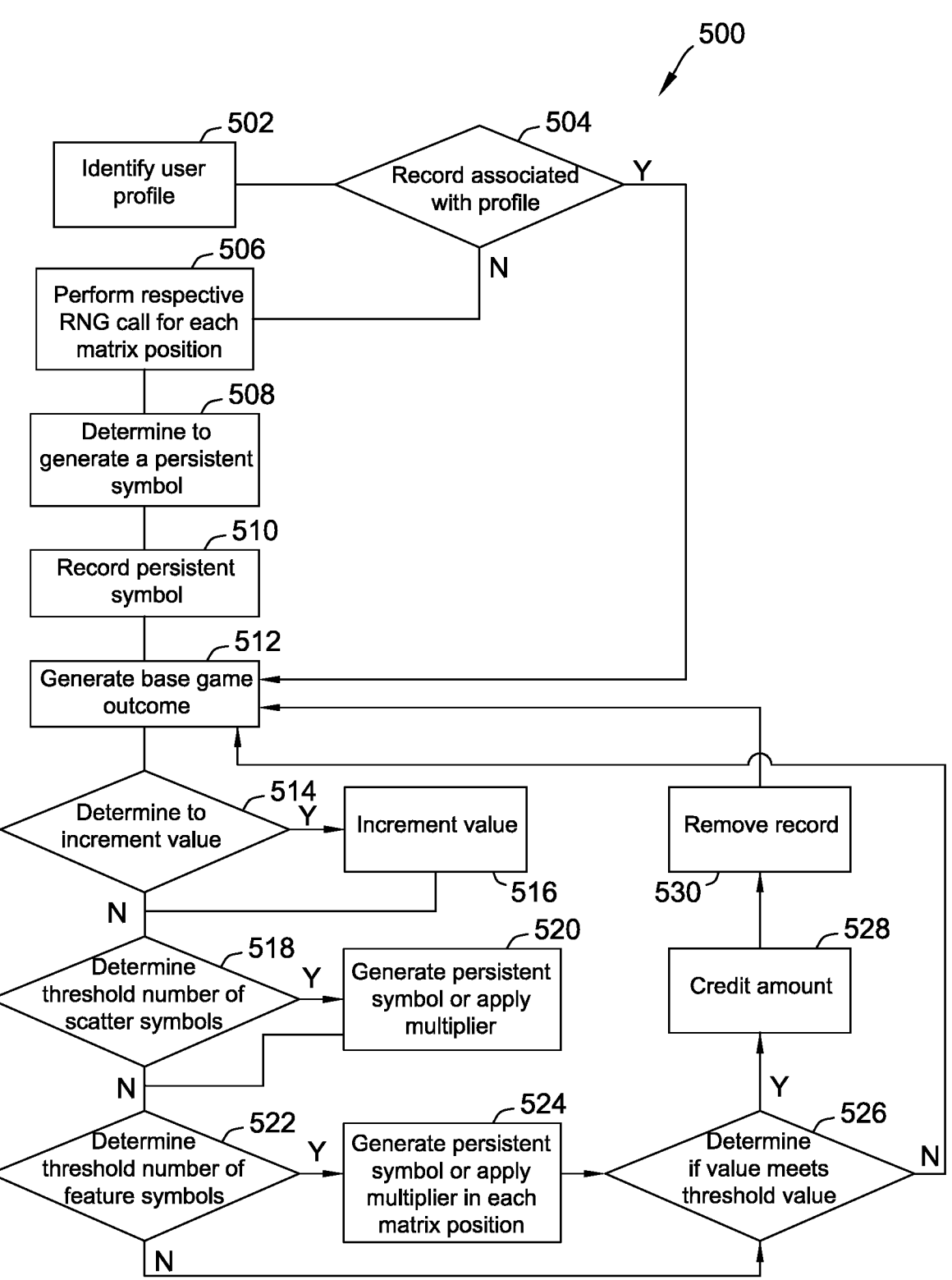
FIG. 5 is a flowchart illustrating an example process for a long term persistence feature for the systems shown in FIG. 1.

FIG. 5 is a flowchart illustrating an example process 500 for a long term persistence feature. Process 500 may include identifying 502 a user profile associated with a current session (e.g., at gaming devices 104A-104X or mobile gaming device 256) and determining 504 if a record is associated with the identified user profile. The profile may be identified based on received login information or a device identifier associated with the device on which the feature is being displayed (e.g., gaming devices 104A-104X or mobile gaming device 256).

If no record is associated with the identified user profile, process 500 further includes performing 506 a respective RNG call for each of matrix position of secondary matrix 404 and determining 508 to generate, in at least one of the matrix positions of secondary matrix 404, a persistent symbol 410 based on the respective RNG call. The persistent symbol 410 has an associated value (e.g., from one to ten). Process 500 further includes recording 510, in the memory in association with the identified user profile, the persistent symbol 410 generated in secondary matrix 404 and the value associated with the persistent symbol 410.

Process 500 may further include generating 512, in base matrix 402, a base game outcome, and determining 514, based on the base game outcome, to increment the value associated with the persistent symbol 410 and incrementing 516 the value associated with the persistent symbol 410 in the memory. For example, in some embodiments, a wild symbol 414 may be displayed in base matrix 402 in a column 406 corresponding to the persistent symbol 410, and the value associated with the persistent symbol 410 may be incremented based on the wild symbol 414 being displayed in the same column. In some such embodiments, other conditions, such a win condition of the base game (e.g., a line win) as defined by a pay table are also required for incrementing the value.

In some embodiments, process 500 may further include determining 518 a threshold number of scatter symbols 412 is displayed in base matrix 402 and, if so, generating 520 a persistent symbol 410 in a matrix position of secondary matrix 404 corresponding to the position of one of the scatter symbols 412 in base matrix 402 (e.g., if no persistent symbol 410 in that position) and/or applying a multiplier to a persistent symbol 410 in a matrix position of secondary matrix 404 corresponding to the position of one of the scatter symbols 412 in base matrix 402 (e.g., if the persistent symbol 410 is already displayed in that position).

In some embodiments, process 500 may further include determining 522 a threshold number of feature symbols 416 is displayed base matrix 402 and, if so, for each matrix position of the second matrix, generating 524 a persistent symbol 410 (e.g., if no persistent symbol 410 in that position) and/or applying a multiplier to a persistent symbol 410 (e.g., if the persistent symbol 410 is already displayed in that position).

Process 500 may further include determining 526 that the value associated with a persistent symbol 410 meets a threshold value, and if so, crediting 528 an amount associated with the first persistent symbol to a player credit balance; and removing 530 the record of the persistent symbol 410 in the memory. In some embodiments, the credit amount associated with the persistent symbol 410 may be displayed prior to the value associated with the persistent symbol 410 reaching the threshold value, such as upon reaching a predefined value less than the threshold value.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. An electronic gaming system comprising:
   at least one game display configured to display a game interface including a first matrix having a first plurality of matrix positions for displaying a base game, and a second matrix having a second plurality of matrix positions for displaying persistent symbols;
   at least one memory; and
   at least one processor in communication with the at least one game display and the at least one memory, the at least one processor configured to:
   identify a user profile associated with a current session;
   retrieve, from the at least one memory in association with the identified user profile, a record of a first persistent symbol displayed in a first matrix position of the second plurality of matrix positions of the second matrix, a value associated with the first persistent symbol, and a credit amount associated with the first persistent symbol;
   generate, in the first matrix, a base game outcome;
   in response to generating the base game outcome, determine a wild symbol is displayed in the first matrix in a column corresponding to the first matrix position;
   determine, based on the base game outcome, to increment the value associated with the first persistent symbol in the first matrix position based on the wild symbol being displayed in the column associated with the first matrix position; and
   increment the value associated with the first persistent symbol in the first matrix position in the at least one memory.

2. The electronic gaming system of claim 1, wherein the at least one processor is further configured to:
   in response to the user profile not being associated with a previous game session, perform a respective RNG call for each of the second plurality of matrix positions; and
   determine to generate, in at least the first matrix position of the second plurality of matrix positions, the first persistent symbol based on the respective RNG call.

3. The electronic gaming system of claim 1, wherein the at least one processor is further configured to:
   determine that the value associated with the first persistent symbol meets a threshold value;
   credit the credit amount associated with the first persistent symbol to a player credit balance; and
   remove the record of the first persistent symbol associated with the user profile in the at least one memory.

4. The electronic gaming system of claim 1, wherein the at least one processor is further configured to:
   receive login information from a user device associated with the at least one game display; and
   identify the user profile based on the login information.

5. The electronic gaming system of claim 1, wherein the at least one processor is further configured to:
   detect a device identifier of a user device associated with the at least one game display; and
   identify the user profile based on the device identifier.

6. The electronic gaming system of claim 1, wherein the at least one processor is further configured to:
   in response to generating the base game outcome, determine a threshold number of scatter symbols is displayed in the first matrix;
   identify a second matrix position in the second matrix corresponding to a position of a first scatter symbol of the scatter symbols displayed in the first matrix; and
   in response to identifying the second matrix position, generate a second persistent symbol in the second matrix position.

7. The electronic gaming system of claim 1, wherein the at least one processor is further configured to:
   determine the first matrix position corresponds to a position of a second scatter symbol of the scatter symbols displayed in the first matrix; and
   apply a multiplier to the credit amount associated with the first persistent symbol in the at least one memory.

8. The electronic gaming system of claim 1, wherein the at least one processor is further configured to:
   in response to generating the base game outcome, determine a threshold number of feature symbols is displayed in the first matrix;
   in response to the determination, generate, in each matrix position of the second matrix not including a persistent symbol, a new persistent symbol; and in response to the determination, apply a multiplier to the credit amount associated with each persistent symbol currently displayed in the second matrix in the at least one memory.

9. The electronic gaming system of claim 1, wherein the at least one processor is further configured to cause the at least one game display to display the credit amount associated with the first persistent symbol in response to the value associated with the first persistent symbol.

10. A method performed by a gaming system including a game display configured to display a game interface including a first matrix having a first plurality of matrix positions for displaying a base game and a second matrix having a second plurality of matrix positions for displaying persistent symbols, a memory, and a processor in communication with the game display and the memory, the method comprising:

identifying a user profile associated with a current session;

retrieving, from the memory in association with the identified user profile, a record of a first persistent symbol displayed in a first matrix position of the second plurality of matrix positions, a value associated with the first persistent symbol, and a credit amount associated with the first persistent symbol;

generating, in the first matrix, a base game outcome;

in response to generating the base game outcome, determining a wild symbol is displayed in the first matrix in a column corresponding to the first matrix position;

determining, based on the base game outcome, to increment the value associated with the first persistent symbol in the first matrix position based on the wild symbol being displayed in the column associated with the first matrix position; and incrementing the value associated with the first persistent symbol in the first matrix position in the memory.

11. The method of claim 10, further comprising:

in response to the user profile not being associated with a previous game session, performing a respective RNG call for each of the second plurality of matrix positions; and determining to generate, in at least the first matrix position of the second plurality of matrix positions, the first persistent symbol based on the respective RNG call.

12. The method of claim 10, further comprising:

determining that the value associated with the first persistent symbol meets a threshold value;

crediting the credit amount associated with the first persistent symbol to a player credit balance; and removing the record of the first persistent symbol associated with the user profile in the memory.

13. The method of claim 10, further comprising:

receiving login information from a user device associated with the game display; and identifying the user profile based on the login information.

14. The method of claim 10, further comprising:

detecting a device identifier of a user device associated with the game display; and identifying the user profile based on the device identifier.

15. The method of claim 10, further comprising:

in response to generating the base game outcome, determining a threshold number of scatter symbols is displayed in the first matrix;

identifying a second matrix position in the second matrix corresponding to a position of a first scatter symbol of the scatter symbols displayed in the first matrix; and in response to identifying the second matrix position, generating a second persistent symbol in the second matrix position.

16. The method of claim 10, further comprising:

determining the first matrix position corresponds to a position of a second scatter symbol of the scatter symbols displayed in the first matrix; and applying a multiplier to the credit amount associated with the first persistent symbol in the memory.

17. The method of claim 10, further comprising:

in response to generating the base game outcome, determining a threshold number of feature symbols is displayed in the first matrix;

in response to the determination, generating, in each matrix position of the second matrix not including a persistent symbol, a new persistent symbol; and in response to the determination, applying a multiplier to the credit amount associated with each persistent symbol currently displayed in the second matrix in the memory.

18. At least one non-transitory computer-readable media having computer-executable instructions embodied thereon, wherein when executed by a processor in communication with a memory and a game display configured to display a game interface including a first matrix having a first plurality of matrix positions for displaying a base game and a second matrix having a second plurality of matrix positions for displaying persistent symbols, the computer-executable instructions cause the processor to:

identify a user profile associated with a current session;

retrieve, from the memory in association with the identified user profile, a record of a first persistent symbol displayed in a first matrix position of the second plurality of matrix positions, a value associated with the first persistent symbol, and a credit amount associated with the first persistent symbol;

generate, in the first matrix, a base game outcome;

in response to generating the base game outcome, determine a wild symbol is displayed in the first matrix in a column corresponding to the first matrix position;

determine, based on the base game outcome, to increment the value associated with the first persistent symbol in the first matrix position based on the wild symbol being displayed in the column associated with the first matrix position; and increment the value associated with the first persistent symbol in the first matrix position in the memory.

* * * * *